(12) United States Patent
Wettemann et al.

(10) Patent No.: US 11,465,331 B2
(45) Date of Patent: Oct. 11, 2022

(54) FILM STRETCHING SYSTEM

(71) Applicant: Brückner Maschinenbau GmbH & Co. KG, Siegsdorf (DE)

(72) Inventors: Anton Wettemann, Vachendorf (DE); Markus Unterreiner, Marquartstein (DE); Jens Adler, Siegsdorf (DE); Stefan Seibel, Bad Reichenhall (DE); Anthimos Giapoulis, Traunstein (DE)

(73) Assignee: Brückner Maschinenbau GmbH & Co. KG, Siegsdorf (DE)

( * ) Notice: Subject to any disclaimer, the term of this patent is extended or adjusted under 35 U.S.C. 154(b) by 87 days.

(21) Appl. No.: 16/666,885

(22) Filed: Oct. 29, 2019

(65) Prior Publication Data

US 2020/0130252 A1 Apr. 30, 2020

(30) Foreign Application Priority Data

Oct. 30, 2018 (DE) ...................... 10 2018 127 073.9

(51) Int. Cl.
*B29C 55/16* (2006.01)
*B29K 67/00* (2006.01)

(52) U.S. Cl.
CPC ...... *B29C 55/165* (2013.01); *B29K 2067/003* (2013.01); *B29K 2995/0053* (2013.01)

(58) Field of Classification Search
CPC ......... B29C 55/00; B29C 55/02; B29C 55/10; B29C 55/12; B29C 55/16; B29C 55/165; C08J 5/18
See application file for complete search history.

(56) References Cited

U.S. PATENT DOCUMENTS 4,310,301 A * 1/1982 Mayers ................. F27B 9/3011
432/121
5,419,021 A * 5/1995 Seroogy ................... D06B 1/02
26/92

(Continued)

FOREIGN PATENT DOCUMENTS

CN 1684817 A 10/2005
CN 102157603 A 8/2011
(Continued)

OTHER PUBLICATIONS

Search Report issued in EP Appln, No. 19199599.2 dated Apr. 17, 2020.

*Primary Examiner* — Joseph S Del Sole
(74) *Attorney, Agent, or Firm* — Nixon & Vanderhye P.C.

(57) ABSTRACT

A film stretching system having the following features: a stretching oven having a plurality of treatment zones through which a plastic foil film can be guided from a feed side to an outlet side through the stretching oven in the drawing-off direction, supply air can be supplied to the respective treatment zone and exhaust air can be discharged therefrom, the ventilation system for the treatment zones is constructed in such a way that exhaust air extracted from the last treatment zone in the drawing-off direction of the plastic foil film is supplied to at least two upstream treatment zones in the drawing-off direction of the plastic foil film, wherein a volume fraction of the exhaust air extracted from the last treatment zone is supplied to only one of the at least two treatment zones and another volume fraction is supplied to only one other of the at least two treatment zones.

14 Claims, 6 Drawing Sheets

(56) References Cited

U.S. PATENT DOCUMENTS

| | | | |
|---|---|---|---|
| 2012/0035285 A1* | 2/2012 | Noumi | B29C 55/143 |
| | | | 521/79 |
| 2012/0210599 A1 | 8/2012 | Inoue et al. | |
| 2013/0129854 A1* | 5/2013 | Darlet | B29C 55/08 |
| | | | 425/363 |
| 2018/0056575 A1* | 3/2018 | Resch | B29C 55/165 |
| 2018/0079113 A1* | 3/2018 | Nakazawa | B29C 35/0288 |
| 2019/0224906 A1* | 7/2019 | Haigermoser | B29C 55/20 |

FOREIGN PATENT DOCUMENTS

| | | | | |
|---|---|---|---|---|
| CN | 102372856 A | | 3/2012 | |
| CN | 203053171 | * | 7/2013 | |
| CN | 203157136 U | | 8/2013 | |
| CN | 107405821 A | | 11/2017 | |
| DE | 36 16 328 | | 3/1989 | |
| EP | 0 623 698 A2 | | 11/1994 | |
| EP | 1616690 A1 | * | 1/2006 | B29C 55/08 |
| EP | 2 123 427 | | 11/2009 | |
| GB | 614536 A | * | 12/1948 | B65B 11/10 |
| JP | 09-13240 A | | 1/1997 | |
| JP | 2007320276 | * | 12/2007 | |
| WO | 2016/146383 | | 9/2016 | |

* cited by examiner

FILM STRETCHING SYSTEM

This application claims priority to DE Patent Application No. 10 2018 127 073.9 filed Oct. 30, 2018, the entire contents of which is hereby incorporated by reference.

The invention relates to a film stretching system according to the preamble of claim 1.

Stretching systems are used in particular in the production of plastics film. Simultaneous stretching systems are known in which a plastic film can be stretched simultaneously in the transverse and longitudinal directions. Sequential stretching systems are also known in which the plastic film is stretched in two successive stages, for example first in the longitudinal direction and then in the transverse direction (or vice versa). Finally, pure longitudinal stretching and pure transverse stretching systems are also known.

As is known, in the production of a plastic film the material web to be stretched is grasped at the two opposite film edges by means of clips that are movably arranged on circulating guide rails on both sides of the material web to be stretched. The clips are successively moved from an inlet zone (in which the edge of, for example, a plastic film to be stretched is grasped) to an outlet zone via a stretching zone (in which the opposing clips on the guide rail portions having a transverse component are moved away from each other in a diverging manner relative to the transport direction) and then back to the inlet zone on a return path, the film of the stretching zone, for example, still usually being subjected to a certain relaxation and/or postheat treatment downstream in one or more treatment zones (annealing zones, cooling zones).

The plastic film must be subjected to different heating and/or cooling phases in the individual portions before, during and after the actual stretching process. As a result, the plastic film web to be stretched passes through an oven that has successive different treatment zones (optionally also with neutral zones in between). In these treatment zones, the plastic foil film to be produced is not only subjected to a different heat treatment but above all an oven air supply must be provided to always supply the oven interior of the stretching system with fresh air and to extract the contaminated air. The supplied fresh air is usually preheated and filtered. In addition, however, the exhaust air from the oven or the respective oven portion must be discharged because film ingredients evaporate during the production process of the plastics film, which ingredients are then present as impurities and can, for example, precipitate as undesirable pollutants on the surface of the plastic film to be produced. These are thus film components that can arise during stretching and during the heating process of the film, for example in the form of polymers, that can then, for example, condense and precipitate on the film (but also on many components located in the interior of the treatment zone, which will be discussed later), even during the cooling process of the film. However, such contamination of the film is in no way desired.

Therefore, an oven for stretching systems is divided into a plurality of treatment zones, each of which is assigned separate air supply units. Depending on the requirements, therefore, the number of required fresh air/exhaust air circuits and thus the number of required air supply units for the oven therefore vary. An example of a typical oven for the production of BOPET films will be explained below. BOPET films are biaxially oriented PET films, that is, films that are stretched in the machine longitudinal direction (MD direction) and in the machine transverse direction (TD direction). A typical oven for the production of such BOPET films explained above can, for example, be divided into five (or more) units, for example into the following treatment zones:

stretching zone or preheating and stretching zone
annealing zone
first cooling zone
second cooling zone
third cooling zone
and neutral zones in between if necessary.

Basically, such stretching systems are constructed in such a way that, for example, the above-mentioned treatment zones are each assigned an air supply unit.

Such air supply units may, for example, consist of a thermally insulated sheet metal housing that is divided into a supply air and an exhaust air region. In some cases, the air supply unit can also comprise only one supply air region for preparing the air to be supplied, while the exhaust air region is realized by a free-standing fan.

The supply air region can comprise the following components (these components do not necessarily need to be provided):

filter
heating device
cooling device
fan
mass flow measuring device
additional sensors and actuators The above-mentioned components can be provided for the respective supply unit, but do not need to be. Likewise, at least in individual treatment zones, other components can also be included.

In known systems, the exhaust air region then substantially comprises a fan and a mass flow measuring device.

In order to safely discharge the contamination from the respective oven space, there is no connection between the supply air and the exhaust air region in the respective supply units.

The design is often such that, for example, an air supply unit comprises a supply air fan that draws in air from the environment of the air supply unit for the stretching oven or from a region outside of a plant building, the air drawn in then being filtered and tempered before the air, which was correspondingly pretreated and brought to a certain temperature, is supplied to a respective oven region, that is to say a specific treatment zone, of the stretching system via the supply air fan.

Many previously known stretching systems have ovens, in the respective treatment zone of which a corresponding amount of air is recirculated within the relevant oven portion and a smaller proportion of fresh air or supply air is only ever resupplied in the time unit and only a smaller proportion is simultaneously discharged from contaminated air. Thus, for example, only a small proportion of 10% of supply air can be added in the "preheating zone", "stretching zone" and "annealing zone" regions compared with the circulating air volume in the oven. If, for example, three cooling zones are provided, then in many cases a higher proportion of newly supplied air has been set in the first and second cooling zones, but this volume fraction of newly supplied air was generally still below 50% of the circulating volume in the oven.

In the last treatment zone, a modification has hitherto usually been provided for the other treatment zones insofar as the last or, for example, third cooling zone has no supply air fan but the supply air is only drawn in by the oven fan via the oven air supply unit. In this last treatment zone, 100% air exchange has often been provided in which the total amount of air that is blown onto the film is supplied via the oven air supply unit while all of the exhaust air is extracted via the exhaust fan and discharged to the outside.

To the extent that exhaust air is removed in the other zones as well, this exhaust air is usually discharged out of the plant building and into the open via corresponding air ducts. Unless heat recovery facilities were installed, this meant that the energy contained in the waste heat of the air had been lost. Such a design requires high energy consumption. This is because although, for example, heat energy input takes place in the cooling zones through the film being cooled there, the cooling zones must be heated due to the air exchange taking place there.

Another problem with stretching systems concerns the polymers or, for example, in the case of PET, the oligomers, that is to say the hydrocarbons that escape from the film during the stretching and heat treatment process in the oven. In the cooling zones, the circulating air temperature is significantly colder than the film temperature. As a result, these oligomers can condense and precipitate on all the interior oven surfaces in the form of white, slightly sticky powder. At the locations in the oven where the cold supply air from the oven air supply is mixed with the circulating air sucked back and heated by the film, a condensate trap forms. This is because the oligomers contained in the sucked-back circulating air condense to a greater extent due to the cooling and precipitate on all the interior oven surfaces. This resublimation or condensation of contaminants escaping from the film results in the need to shut down the entire system from time to time, in particular to clean the cooling zones.

Therefore, various methods have already been proposed to prevent contamination with oligomers. In one case, attempts have been made to use plastic materials for film production that contain the smallest amount possible of oligomers, that is, of low molecular weight substances present in the polymers. In addition, attempts have been made to avoid or at least reduce the deposition of oligomers sublimated from the polymers onto the film surface during the production of the film.

Accordingly, DE 36 16 328 C2 has already proposed blowing heated air containing substantially no oligomers onto the downstream side of the film in a separate zone in the transverse stretching zone and/or the thermofix zone, forming an air curtain near the dividing wall of the zone with respect to the direction of movement of the film, specifically in the widthwise direction across the surface of the film, it being intended to then extract this air via a flow upstream of the air feed region.

In contrast, according to WO 2016/146383 A1, it has been proposed
a) to circulate a treatment fluid in each treatment zone and to guide only a portion of the treatment fluid from the respective treatment zone to the subsequent treatment zone in the process,
b) wherein the transfer of this portion of the treatment fluid is to take place in a subsequent treatment zone in the process via a bypass parallel to the transport path of the plastic film being moved through the oven, and
c) wherein a heat exchanger, by means of which the supplied portion of the treatment fluid is to be adapted to the temperature required in this treatment zone for the process of thermally treating the film, is installed in a respective treatment zone.

A further improvement is to be achieved by, regardless of the above-described conveying of a portion of the treatment fluid from one treatment zone into a subsequent one, i.e., in the drawing-off direction of the plastic film (according to the "co-current principle"), realizing a reversal with respect to the last treatment zone insofar as a portion of the treatment fluid extracted therefrom is conveyed into a plurality of process-related upstream treatment zones, namely in such a way that the treatment fluid is first conveyed from the last treatment zone into the penultimate treatment zone and then from the penultimate treatment zone into an antepenultimate treatment zone, etc. according to the "countercurrent principle". Where the treatment fluid supplied to the plurality of treatment zones according to the "co-current principle" coincides with the treatment fluid passed on from the last treatment zone over a plurality of stages in the "countercurrent principle", both fluid flows are discharged from the oven via a combined removal point for discharging that is provided there.

Against this background, it is the object of the present invention to provide a further improved stretching system in which in particular the energy required for heating in the stretching oven is kept as low as possible, but on the other hand the necessary treatment temperatures in the individual treatment zones of the oven can be achieved, and that the oligomers present in the air space in the respective treatment zone of the oven, in particular in the cooling zones, nevertheless do not precipitate and condense or in any case precipitate and condense to a lesser extent or at least contribute to a significant reduction of the condensates precipitating in a treatment zone or treatment chamber.

The object is achieved according to the invention according to the features specified in claim 1. Advantageous embodiments of the invention are specified in the subclaims.

It must be assessed as extremely surprising that significant improvements over the conventional solutions can be achieved in the context of the invention with the proposed measures.

In contrast to the prior art, the solution according to the invention proposes that a treatment fluid, usually air, be removed in the last treatment zone and that this treatment fluid be introduced into at least two treatment zones of the stretching oven that are upstream in the process, not in cascaded form but in a separate form.

In other words, treatment fluid from one of the last or preferably the last treatment zone is not first supplied to a penultimate treatment zone and from there to a treatment zone further upstream, but the treatment fluid blown into the oven there is taken, i.e., generally extracted, from the last treatment zone, for example in the form of a third cooling zone, to supply a portion of the volume of this treatment fluid, for example, to the penultimate treatment zone (e.g. in the form of a second cooling zone) and to another part of the volumetric flow of the treatment fluid, for example, to the oven interior of a treatment zone further upstream, for example in the form of a first cooling zone.

Likewise, it is also possible in the context of the invention to proportionally supply a third or fourth portion, etc. of the volumetric flow taken from the last treatment zone to the other treatment zones.

In other words, it is provided in the context of the invention for air from the last zone (for example, the third cooling zone) to be removed and distributed to the zones in front of it. In addition, of course, additional fresh air can also be supplied to the upstream zones, i.e., the exhaust air extracted from the last treatment zone can be mixed with fresh air and supplied to the other zones.

The air supply units assigned to the individual treatment zones are preferably constructed such that supply air correspondingly treated in the respective treatment zone can be supplied separately to both the oven upper space and the oven lower space, that is, corresponding supply air can be blown into the respective treatment space both onto the upper side of the film and onto the underside of the film.

In principle, two air supply units could be provided here for each treatment zone. Preferably, however, an air supply unit in which the supply air can be treated accordingly and then supplied to the upper and lower space in the oven is used in each case for each treatment zone.

Furthermore, the air supply units are preferably equipped with control devices for adjusting the volumetric flow (that is, for example, the control with respect to the proportion of fresh air and the proportion of the exhaust air from the last treatment zone), with filters and/or with various temperature sensors, with pressure sensors, etc. to optimally control the entire system.

The explained advantages show that a significant advantage of the invention is that, in particular, exhaust air originating from the last treatment zone is ultimately used or can be used as fresh air for the other upstream zones. In this case, however, it is ensured that the exhaust air originating from the in particular last treatment zone is not first supplied to an upstream treatment zone and then from there to a further treatment zone upstream in the process, etc. because this results in excessive exposure of the exhaust air to oligomers.

Furthermore, it has proved to be particularly advantageous that the individual treatment zones were "slimmed down" with respect to the components required to produce a corresponding air circulation in the interior of the treatment zone, i.e., the additional components previously present in the interior of a treatment zone were removed. In other words, the stretching oven according to the invention in particular no longer has fans in the individual treatment zones.

In summary, it can be stated that the invention provides two primary and therefore essential advantages, namely, in addition to optimal air reuse or air distribution, the invention achieves:
 the possibility of significant reduction of the heating energy requirement compared to conventional solutions and
 a significant improvement in the contamination in the oven.

Further advantages, details and features of the invention will become apparent from the embodiments illustrated with reference to drawings. In detail:

Figure 1:
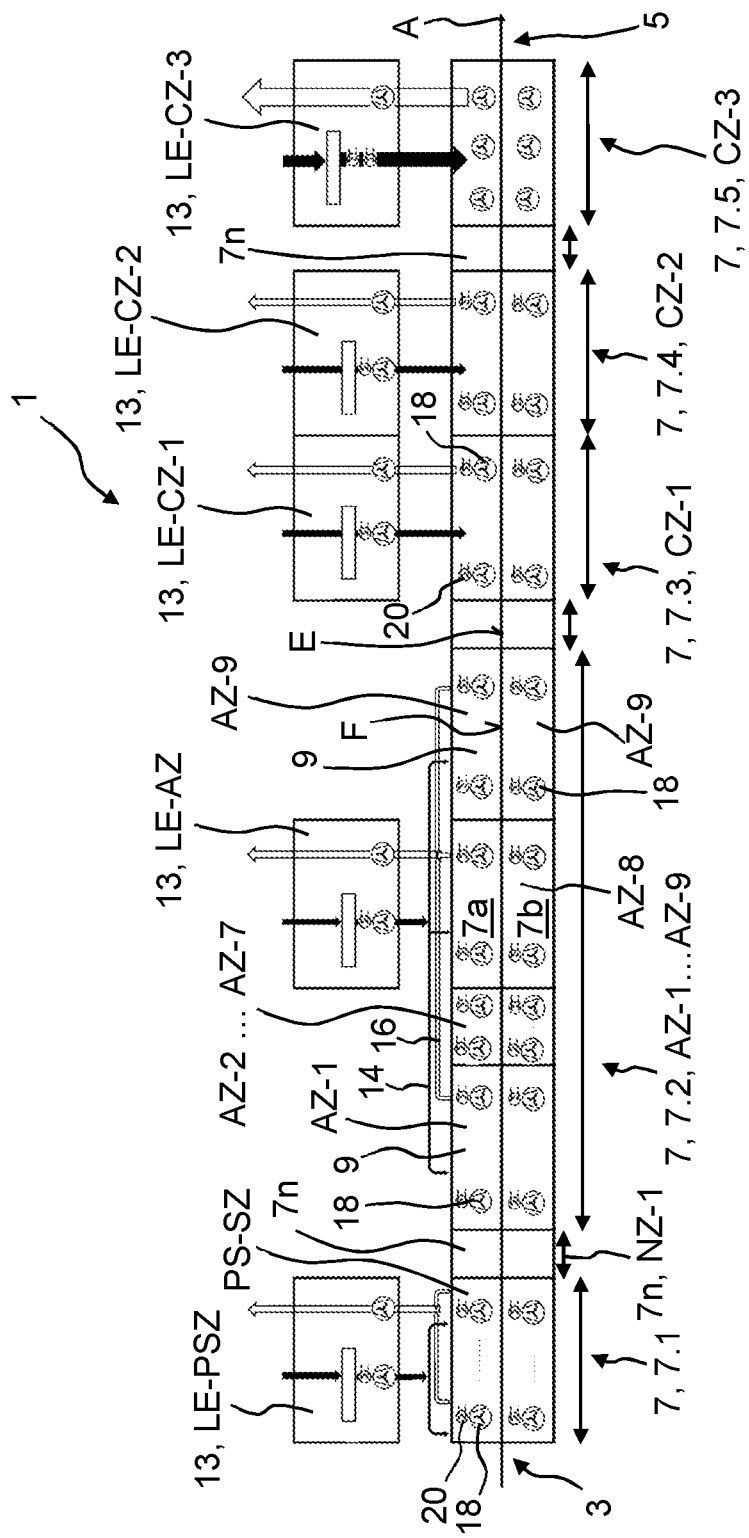
FIG. 1 is a schematic representation of a basic design of a stretching system known from the prior art.
Figure 5:
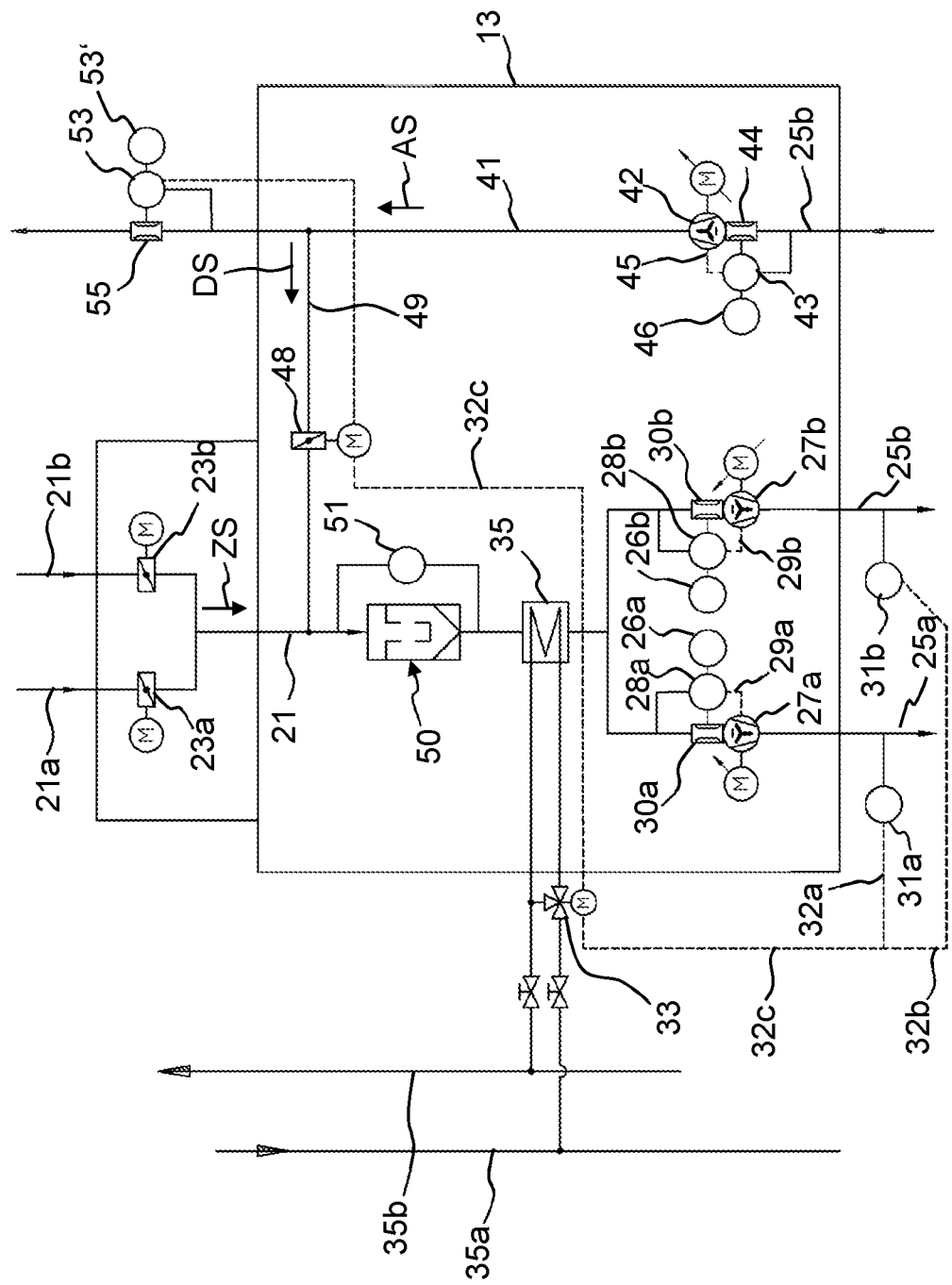
Figure 6:
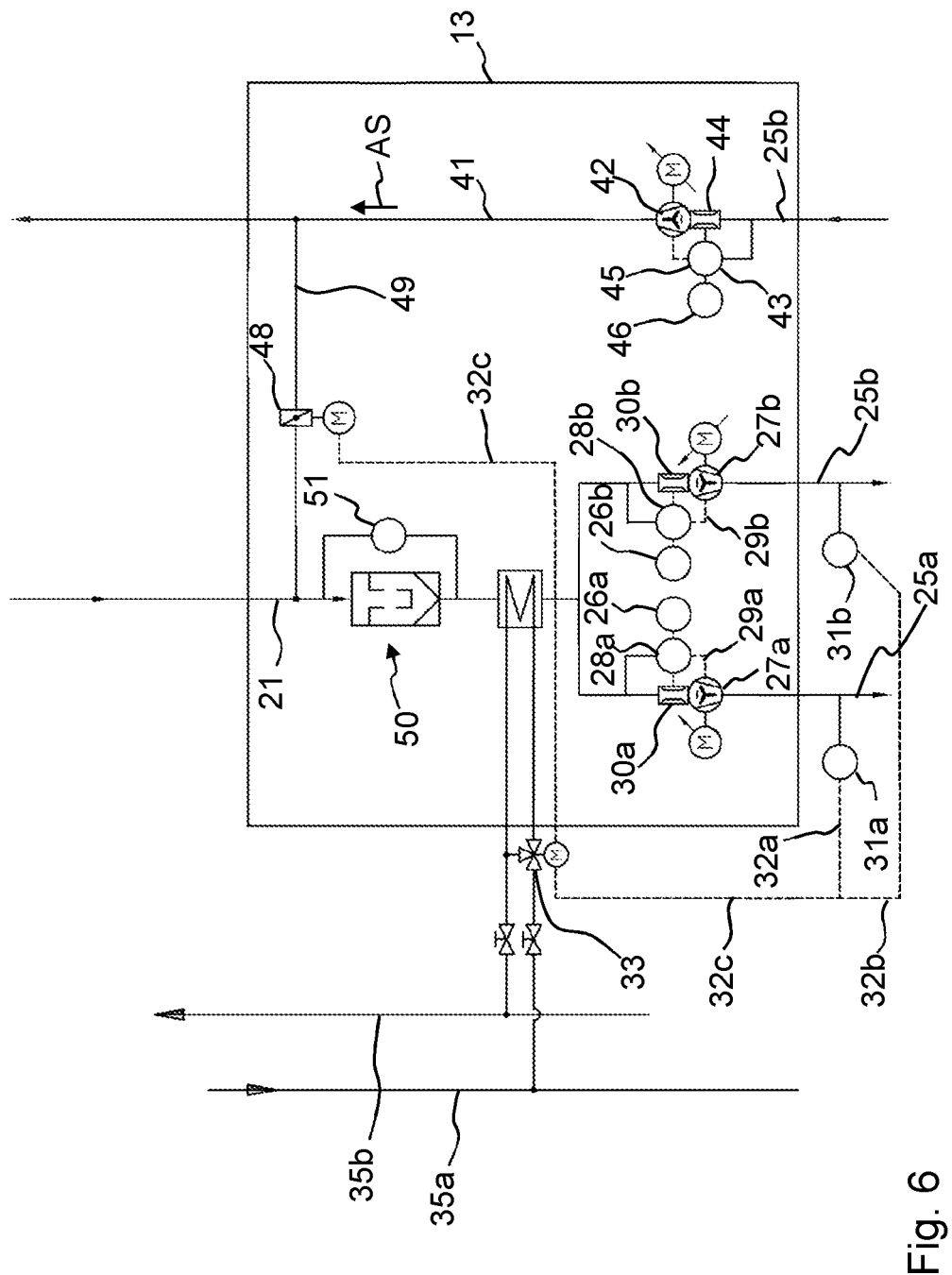

FIG. 5 shows a schematic structure of an air supply unit according to the invention as is assigned to an individual treatment zone; and FIG. 6 shows a schematic structure of an air supply unit according to the invention as is preferably used in the context of the last treatment zone. FIG. 1 shows the schematic structure of a stretching system according to the invention, i.e., at least part of a stretching system insofar as the stretching system comprises a corresponding stretching oven 1.

It is known that in the production of plastic film a melt film is first extruded onto a cooling roll of a film removal machine via a nozzle (for example, a slot die) in order to then remove the cooled and at least pre-cured melt from the film removal machine and then supply it to the actual stretching device, in order to then supply the film, for example, to a removal stage having a winder arrangement at the end of the stretching unit after leaving the last treatment zone.

The stretching system can, in principle, be a simultaneous stretching system in which the plastic foil film is stretched simultaneously in the actual stretching zone, i.e., simultaneously in the longitudinal and transverse directions, or it can also be a sequential stretching system in which the plastic film is, for example, first stretched in the longitudinal direction and then in the transverse direction (or vice versa). In principle, however, the stretching system can also be a purely transverse stretching system.

A sufficiently cured film is thus ultimately fed from the cooling roll to stretching oven 1. FIG. 1 shows, on the one hand, feed side 3 and outlet side 5 from the stretching oven, the film F conveyed through stretching oven 1 in drawing-off direction A through stretching oven 1 also being shown in a cross section perpendicular to film plane E.

In the embodiment shown, stretching oven 1 is shown in a plurality of treatment zones 7 having associated treatment chambers 9 that are arranged consecutively in drawing-off direction A. The stretching oven, also referred to below as oven 1, thus comprises a plurality of treatment zones 7 that can, in turn, have at least one, for example two or generally a plurality of treatment chambers 9.

The possible design of such a stretching system having an associated stretching oven 1, which is shown only by way of example in FIG. 1, can thus comprise, for example, the following treatment zones 7, namely in succession from feed side 3 to outlet side 5:
 a preheating and stretching zone 7 (or only a stretching zone 7 without an associated preheating zone) that is additionally identified in FIG. 1 with the reference sign PZ-SZ,
 a subsequent first neutral zone 7n, which is additionally denoted in FIG. 1 by reference sign NZ-1, no specific film treatment usually taking place in this neutral zone 7n such that no separate air supply device or exhaust air device must be provided in this region; however, a treatment zone 7 can nevertheless be provided in the form of an annealing zone AZ, that is, a special heat treatment zone of the film after completion of the stretching process in which a certain relaxation can also take place. The above-mentioned annealing zone AZ can (as well as single or multiple or all other treatment zones 7) be divided into two or more treatment chambers 9. In the embodiment shown, annealing zone 7, AZ comprises nine treatment chambers 9 that are identified with the reference signs AZ-1 to AZ-9, treatment chambers AZ-2 to AZ-7 being indicated only in part. Nevertheless, these are separately arranged annealing chambers 9, each representing separate treatment chambers 9 to which either an air flow can be supplied in a separate, adjustable composition with a separately preselectable temperature and predeterminable volume or, as indicated in FIG. 1, a common air flow can usually be supplied via a common air supply unit 13, which in this sense has a homogeneous composition for all the annealing chambers 9 (AZ-1 to AZ-9) and is heated to a common temperature. However, as can be seen from the schematic illustration according to FIG.

1, one or a plurality of air circulating means and/or heating devices is also provided in these treatment chambers AZ-1 to AZ-9, as a result of which air treatment and heating that can be adjusted to respective annealing chamber 9 in different ways can still be implemented in each annealing zone AZ-1 to AZ-9 (in general, therefore, the temperatures in treatment chambers AZ-1 to AZ-9 can all be different and independent of the temperature of the supply air of air supply unit 13. The number of annealing chambers may be different); after annealing zone AZ, a neutral zone can again be provided, that is, a second neutral zone NZ-2 in the system shown in FIG. 1;

this is followed by three further treatment zones 7 in drawing-off direction A of the film, namely three cooling zones CZ-1, CZ-2 and CZ-3;

one or more neutral zones can also be provided between the described cooling zones. In the embodiment shown, a third neutral zone NZ-3 is provided between second and third cooling zones CZ-2 and CZ-3.

The schematic illustration according to FIG. 1 thus shows that neutral zones NZ-1, NZ-2 and NZ-3 in fact only represent neutral intermediate zones to which no separate air supply units are assigned. It should be noted that FIG. 1 only shows a basic example. The stretching ovens can, in principle, also be designed completely differently, for example by having more or fewer treatment zones 7 that are also in the form of annealing zones 9 or neutral zones NZ having more or fewer treatment chambers 9. There are no limitations in this respect.

In the other treatment zones 7, an air supply unit 13 is also provided in each case in the embodiment shown in FIG. 1, by means of which corresponding volumetric flows of supply air can be supplied to the individual treatment zones on the one hand and a corresponding volume of exhaust air can also be discharged from individual treatment zones 7 and controlled not only in terms of volume, but also in terms of temperature, possibly air composition, pressure, flow rate, etc., which will be discussed below.

The individual air supply units 13 are abbreviated as LE-PSZ, LE-AZ, LE-CZ-1, LE-CZ-2 and LE-CZ-3 provided that the corresponding air supply unit 13 is assigned to preheating and stretching zone PZ-SZ, annealing zone AZ or three cooling zones CZ-1, CZ-2, CZ-3.

Air supply units 13 can be constructed in treatment zones 7 in such a way that a corresponding branching is ultimately provided (as indicated schematically in FIG. 1) to the extent that the supply air supplied on the one hand to a treatment zone 7 and thus to one or a plurality of treatment chambers 9 is supplied to the respective treatment zone upper space 7a above plastic film F, which is guided through oven 1, and on the other hand to the treatment zone lower space 7b, which is formed in the respective treatment zone 7 below plane E of plastic film F. In this case, the supply of the respective air supply unit 13 can be supplied via branch lines 14, for example to different chambers 9 (as shown for example in FIG. 1 with respect to annealing zone AZ), such that the supply air coming from air supply unit 13 is supplied to the individual treatment chamber upper spaces 9a above plastic film F, which is guided through oven 1, on the one hand and to the respective treatment chamber lower spaces 9b on the other hand. The exhaust air can be discharged and/or further processed via branch lines 16 and, for example, via the annealing zone AZ assigned to air supply unit 13, which will be discussed later. All this makes it possible for the respective air supply units 13 to appropriately preheat and/or prepare the air for the respective treatment zones 7, it then additionally being possible to individually adjust the circulating air modules and/or heaters assigned to the individual treatment zones and/or treatment chambers in the individual treatment zones 7 or treatment chambers 9. The corresponding circulating air modules 18 in treatment zones 7 or treatment chambers 9 and heaters or heating devices 20 additionally provided in treatment zones 7 or treatment chambers 9 are arranged schematically in FIG. 1.

In this case, each circulating air module 18 (for example in the form of a fan) is also assigned one of the mentioned heaters or heating devices 20.

FIG. 1 also shows that air supply unit 13 is provided for annealing zones AZ, that is to say air supply unit LE-AZ is provided for all the provided annealing zones AZ-1 to AZ-9, i.e., the corresponding supply air is split into the nine treatment zones provided here via the indicated supply and/or branch lines 14 and the exhaust air from all the treatment chambers 9 is discharged together to the outside and/or to the respective air supply unit 13 via a sum circuit and/or sum line 16. However, deviations may also be provided here that involve installing additional air supply units 13 for one or a plurality of the envisaged annealing zones and/or, for example, separately discharging the exhaust air to the outside from the respective annealing zones. Further variants are possible.

Figure 2:
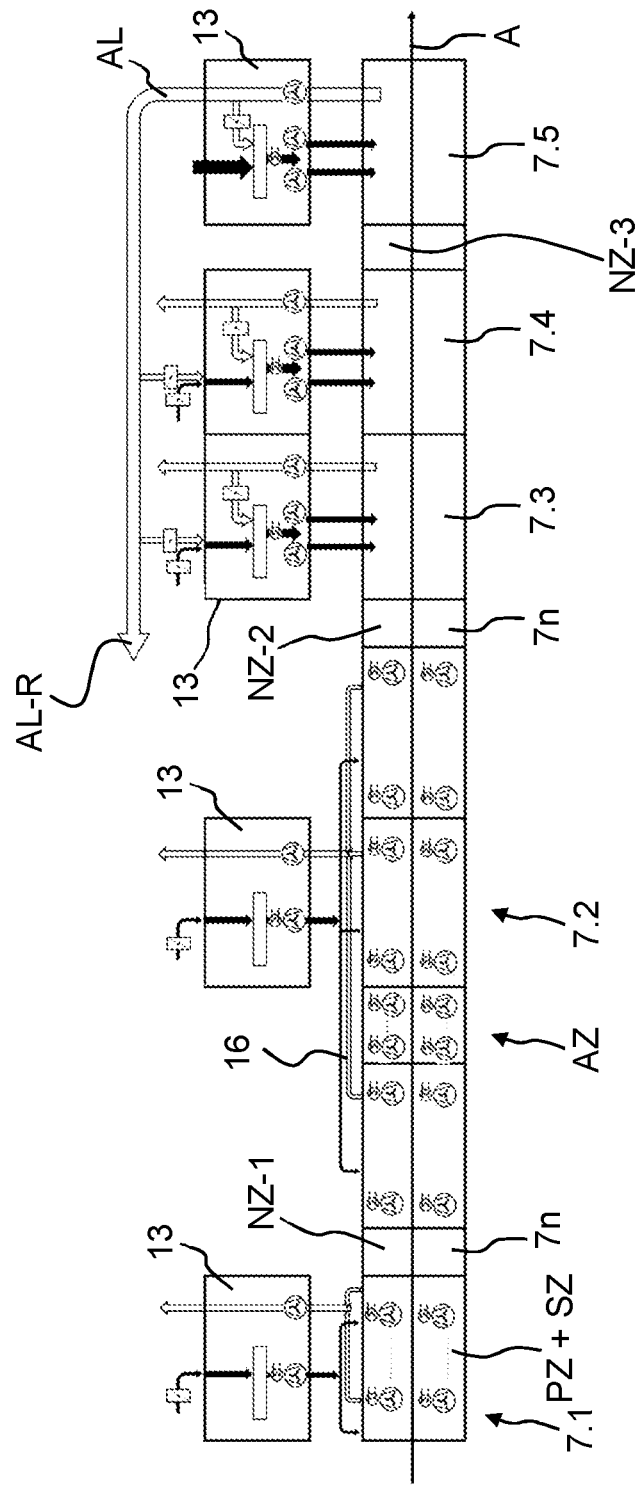
FIG. 2 is a schematic representation of the exhaust air extracted from or blown out of a respective treatment zone and the supply air or fresh air supplied to a treatment zone as well as the transfer of exhaust air originating from the last treatment zone to the other treatment zones.

Reference is made in the following to FIG. 2, in which the inventive and thus functional design of the stretching system and the currents with respect to the supplied supply air and the discharged exhaust air are reproduced in greater detail.

At this point, it is already noted that although reference is made to "circulating air", "supply air" or, for example, "exhaust air" or even an "air supply unit", etc., the term "air" is understood to mean all gaseous fluids that can be used as a circulating fluid in the context of such a stretching system. Thus, these may be gaseous fluids and media containing additives and components other than air or consisting of other gases or composed of other gases that are not commonly subsumed under the generic term "air".

In FIG. 2, it is indicated by way of example only and in accordance with FIG. 1 that, apart from the three neutral zones NZ-1 to NZ-3, to which no supply air is supplied and with respect to which no separate film treatment device and no air supply unit 13 are otherwise associated, a total of five treatment zones are provided and indicated, the five treatment zones PZ-SZ, AZ, CZ-1, CZ-2 and the last treatment zone CZ-3 being numbered with reference signs 7.1, 7.2, 7.3, 7.4 and 7.5.

In principle, the design of the individual treatment zones 7 is such that the treatment medium (in principle air) located in a treatment zone 7 is not intended to overflow from one treatment zone 7 into a subsequent treatment zone 7 following plastic film F, which is guided through the entire stretching oven 1. This means that each treatment zone is usually provided with a film inlet opening and a film outlet opening that is dimensioned and/or provided with an air flow device in such a way that, for example, a kind of "air curtain" is preferably formed that, at least as far as possible, reduces a direct flow of air from the interior of one treatment zone to the next treatment zone. Therefore, to some extent, there is an unwanted exchange of air between the individual zones (and between the individual chambers).

This separation and partitioning can be improved further, for example, by providing a further neutral zone NZ (in this case NZ3) between two successive treatment zones 7, such as the two last treatment zones CZ-2 and CZ-3. Purely by way of precaution, it should be noted at this point that, in principle, the construction may also deviate from the drawings shown in that more or fewer cooling zones and more or fewer other treatment zones and/or neutral zones (and at a different position) may be provided.

In this third cooling zone CZ-3 (last treatment zone 7.5), 100% air exchange operation preferably takes place, that is, the entire amount of air blown onto film F is supplied via air supply unit 13 associated with the third cooling zone CZ-3 while all of the exhaust air from this last treatment oven 15n is extracted via an exhaust air device, preferably in the form of an exhaust air fan, and discharged to the outside from treatment oven 15.

This exhaust air AL, which is discharged from the third cooling zone, is the least contaminated, that is, it has the lowest proportion of vaporized film ingredients, usually oligomers. In addition, the temperature of the exhaust air discharged from the last treatment zone is above the temperature of the air supplied to this last zone, the so-called supply air. This is because the plastic film passed through is to be cooled further with the supplied air, the heat emitted by the plastic film then resulting in heating of the circulating air and thus the exhaust air.

This least contaminated exhaust air is supplied to at least two process-related upstream treatment zones 7 (i.e. in the opposite direction to drawing-off direction A of plastic film F) by utilizing the heating caused by the plastic film, as shown in FIG. 2, only separately, that is to say separately from the penultimate and antepenultimate zone 7.

The exhaust air extracted from or flowing out of the last treatment zone 7.5 (CZ-3) is supplied to the penultimate treatment zone 7.4, that is, treatment zone CZ-2, in the illustrated embodiment of FIG. 2 in a concentration of, for example, 40% by volume. This penultimate treatment zone 7.4 also receives separate fresh air as supply air that does not originate from another treatment zone 7 or treatment chamber 9. The exhaust air from this penultimate treatment zone 7.4 is discharged to the outside and not used further. Alternatively, however, it is also possible for the exhaust air discharged from this treatment zone 7.4 or at least part of this exhaust air to be returned to this treatment zone 7.4.

The ratio of the distribution of the volumetric flow of 40% to 60% between the penultimate treatment zone 7.4 (CZ-2) and the antepenultimate treatment zone 7.3 (CZ-1) mentioned above by way of example can be set as desired. Thus, for example, the penultimate treatment zone 7.4 could receive 70% of the volumetric flow of the exhaust air from the last cooling zone CZ-3 and the antepenultimate treatment zone 7.3 could receive only 30%. Theoretically, it would even be possible to supply a volume fraction to no zone such that the sum of the individual volumetric flows does not necessarily have to be 100%.

Another proportion of the exhaust air drawn off or extracted from the last treatment zone 7.5 is supplied to the antepenultimate treatment zone 7.3, that is, the antepenultimate treatment zone CZ-1, for example, with a remaining proportion of 60%.

However, it is not absolutely necessary to divide all of the exhaust air 100%, for example, into upstream zones 7.4 and 7.3. It would also be possible, for example, for 30% of the air from treatment zone 7.5 to be used for treatment zone 7.4 and 30% for treatment zone 7.3 and the remaining 40% to be transported away from the system as exhaust air (i.e. not reused).

Figure 3:
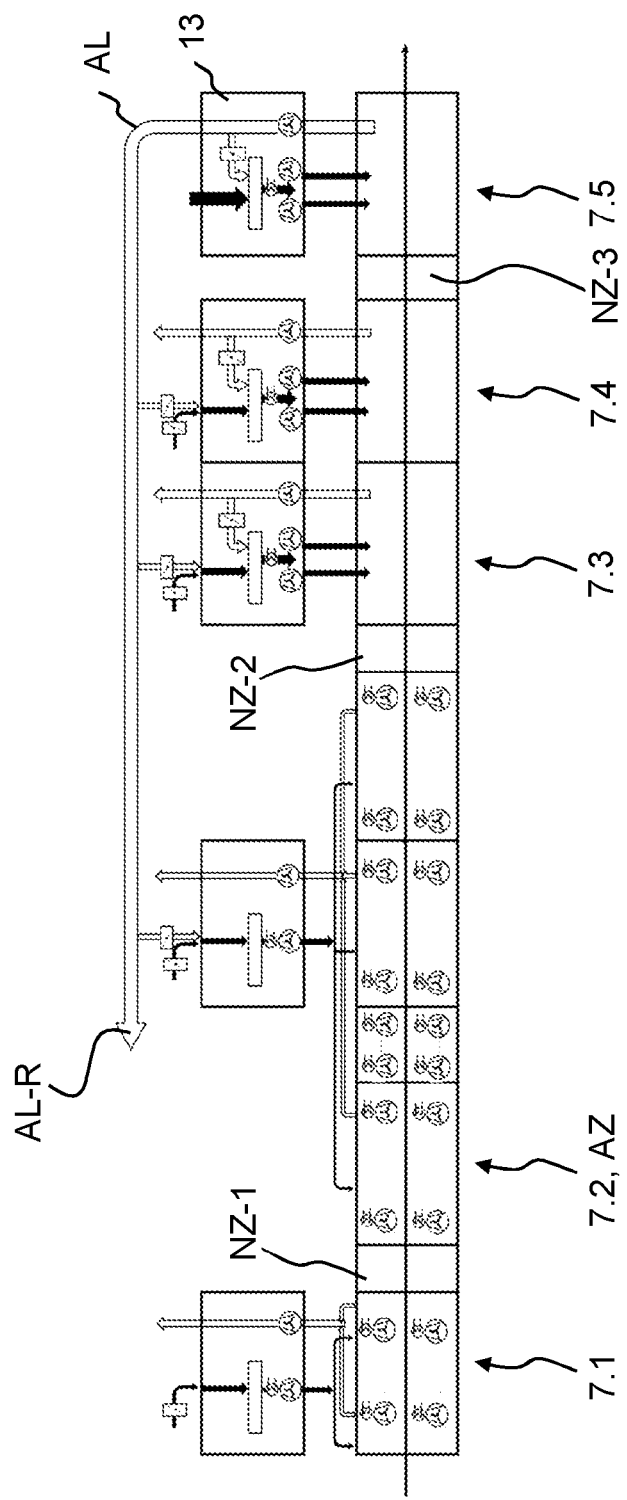
FIG. 3 is an illustration corresponding to FIG. 2 with a modification implemented with respect to FIG. 2.
Figure 4:
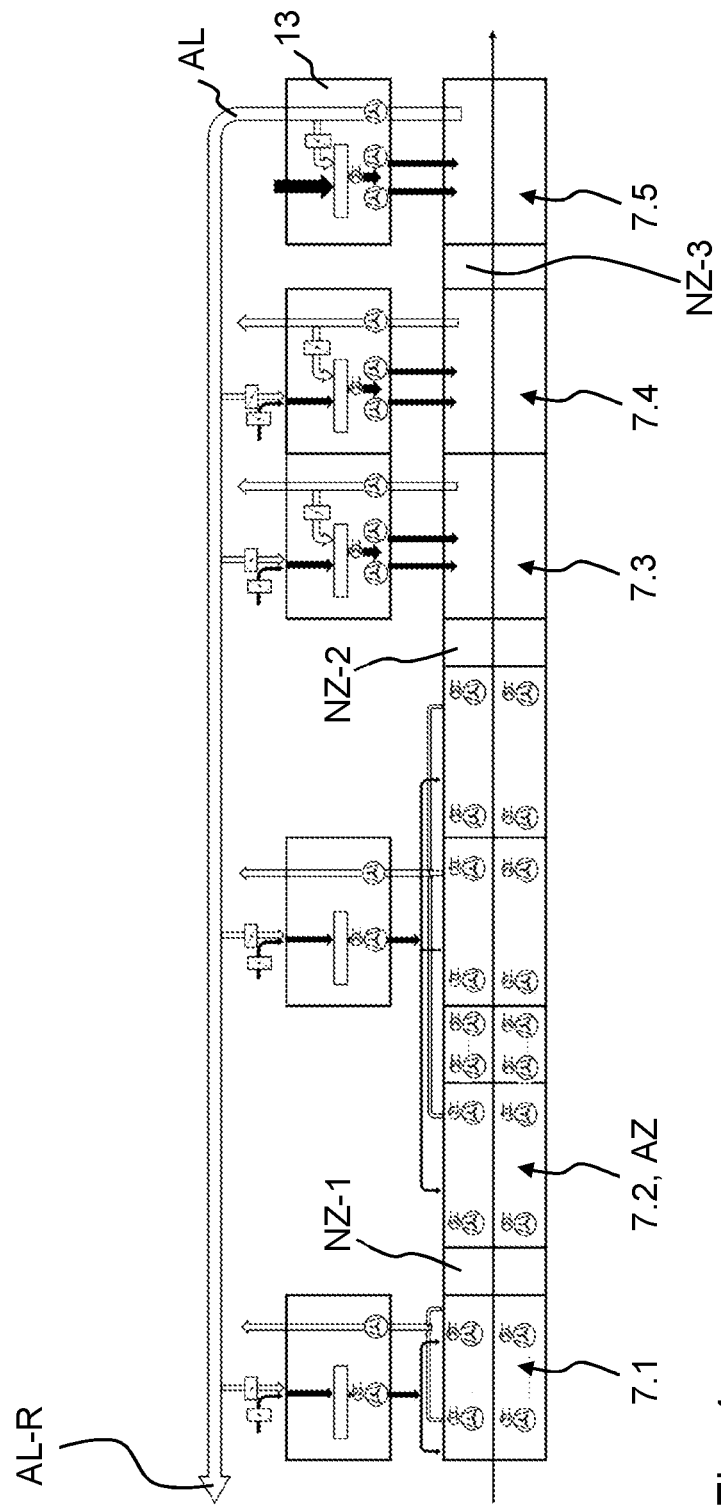
FIG. 4 is a further modification with respect to the embodiment according to FIG. 2 or FIG. 3.

For this reason, in FIGS. 2 to 4, the large arrow above air supply units 13, which indicates the volumetric flow AL originating from the last treatment chamber 7.5, is continued and indicated by AL-R. In the above-explained example, this means that, according to arrow AL-R, a residual proportion AL-R of, for example, 40% of the volumetric flow AL withdrawn from the last treatment chamber 7.5 is discharged from the system as non-recirculated exhaust air. A corresponding or comparable situation is also possible in all the other embodiments.

In the context of the invention, it is thus possible to supply the exhaust air originating from the last treatment zone 7.5 (100% volumetric flow) in any ratio to the penultimate and last treatment zone 7.4 and 7.3 or, in general, to at least two upstream treatment zones on the one hand and to discharge any remaining proportion of exhaust air out of the system on the other hand. In one application, the residual portion AL-R, which can, in principle, be discharged from the system, can also be limited to 0%, namely if the 100% exhaust air from the last treatment zone 7.5 is supplied only to at least two upstream treatment zones and thus the associated air supply units in any ratio without discharging a residual portion AL-R from the system.

The other treatment zones 7.1 and 7.2 separately receive fresh or supply air from the building interior in which the system is located or from outside the building via supply lines, the exhaust air from these treatment zones 7.1 and 7.2 being discharged to the outside, preferably outside of the plant building.

Unlike in FIG. 2, the embodiment according to FIG. 3 indicates that, for example, a treatment zone further upstream receives a partial volumetric flow of the exhaust air originating from the last treatment zone 7.5, that is to say the volumetric flows of the exhaust air originating from the last treatment zone 7.5 are divided into three treatment zones 7, it being possible to adjust the division ratio in the corresponding air supply units 13.

This third treatment zone 7.2 supplied with exhaust air from the last treatment zone can be, for example, annealing zone AZ.

Furthermore, additional upstream treatment ovens could additionally or alternatively be supplied with exhaust air, it even being possible in extreme cases for all the upstream treatment zones 8 to receive a proportion of the exhaust air originating from the last treatment zone 9, as indicated schematically in FIG. 4.

In principle, it is also possible for two or more upstream treatment zones to be supplied with exhaust air from the last treatment zone, at least one intermediate and therefore upstream treatment zone being omitted. In other words, for example, exhaust air from the last treatment zone 7.5 can be supplied to treatment zones 7.4 and 7.2, but not to treatment zone 7.3 therebetween. There are no restrictions in this respect.

Reference is now made to FIG. 5, in which the design of an air supply unit 13 is discussed merely by way of example.

Therefore, the air supply unit 13 shown in FIG. 5 preferably has the following basic design:

An air supply line 21 is provided via which air can be supplied to an associated treatment zone 7.

This supply line 21 has branch lines 21a and 21b on the input side. Pure fresh air is supplied to one branch line 21a, that is to say uncontaminated air that originates from no other treatment zone 7, nor from the same treatment zone 7 to which the supply air is to be supplied.

Exhaust air from the last treatment zone 7.5, that is, from the last treatment zone 7.5, can be supplied to the second branch line 21b, which in the embodiment shown represents a cooling zone, namely the last cooling zone CZ-3.

In two branch lines 21a and 21b, one each of a valve control 23a or 23b driven via a motor M is preferably provided that serves to adjust the mixing ratio between the pure fresh air from the environment and the exhaust air of the third cooling zone CZ-3. Valve control 23a or 23b comprises, for example, a louver damper control. The associated louver dampers can be adjusted in a passage ratio in a range of a 0% to 100% opening angle. They are preferably coupled in opposite directions. That is, when the damper connected, for example, in the fresh air line is opened, the damper connected in exhaust air branch line 21b is closed in a corresponding ratio such that the total volumetric flow always remains the same, that is to say it remains at 100%. Deviating from this, it is also possible for fresh air supplied via branch line 21a and/or exhaust air from the last treatment zone 7.5 supplied via branch line 21b, that is, the last cooling zone CZ-3, to be mixed together with air from the respective treatment zone such that 100% of the volumetric flow is achieved as a result.

In each case, the damper control can comprise, in addition to the dampers, a motor M controlling the dampers having the associated control unit.

The air flow set in the corresponding mixing ratio is thus passed through air supply unit 13 through supply air line 21 and then ultimately split into two branch lines 25a, 25b, usually in a 50/50 ratio. Via these two branch lines, two equal volumetric flows are supplied to the treatment zone upper space 7a on the one hand and to the treatment zone lower space 7b on the other hand, in each case with respect to same treatment zone 7.

For conveying the supply air, corresponding fans, so-called supply air fans 27a and 27b (which can each be driven via a motor M) are provided that are integrated in each of two supply air branch lines 25a, 25b. Instead, a supply air fan or an additional supply air fan 27 could also be arranged in the common supply air line 21.

Furthermore, a mass or volumetric flow measurement for the supply air is provided, preferably not in the common supply air line 21 but in the two supply air branch lines 25a and 25b. These mass flow measuring devices 28a and 28b serve to measure and regulate the mass and volumetric flows conveyed by the supply air fans. The desired supply air flow rates can be set in a system operating program. By controlling the fan speeds, the set volumetric flows are kept constant.

The corresponding control line of mass flow device 28a, 28b to the associated supply air fans 27a and 27b, each connected to the respective branch line 25a, 25b, are indicated by 29a and 29b and shown in dashed lines in FIG. 5.

In FIG. 5, a temperature sensor 26a and 26b, which is assigned to the respective mass flow device 28a, 28b, is also shown.

To perform the mass flow measurements optimally, the respective mass flow measuring device 28a, 28b is assigned to a throttle portion 30a or 30b. As can also be seen from the drawings, temperature sensors 31a and 31b, by means of which the supply air temperature is not only measured in supply air branch lines 25a, 25b immediately before the supply air enters arranged zone 7 but ultimately also returned via a control loop and can also be adjusted, are provided in supply line 21, preferably as close as possible to the actual treatment zone 7. In other words, these sensors are mounted immediately before the supply air enters the associated treatment zone 7. In this case, temperature sensor 31a measures the supply air for the air outlet nozzles provided in the treatment zone upper space 7a, whereas temperature sensor 31b measures the temperature for the supply air that is supplied to the treatment zone lower space 7b.

In the aforementioned system operating program, only the mean value of the two temperature values is displayed on the operator interface. The heating power is preferably controlled at an average value.

However, other variants with regard to a desired change in the supply air temperature control are also possible. Thus, it is also possible to regulate the supply air temperature on the heating element not by means of the heating power but also by means of the flap positions of the bypass flap 48, which will be discussed later.

The corresponding control lines 32a, 32b of sensors 31a and 31b are also indicated by dashed lines in FIG. 5. By this means, an end valve 33 that controls a corresponding heat exchanger 35 in the common air supply line 21 via a motor is ultimately controlled. In the heat exchanger, a heating fluid that flows into the heat exchanger at 300° C. and flows off at, for example, 280° C. can circulate, a quantity of energy of 150 kW, for example, being discharged to the supply air flowing through common supply air line 21 in accordance with the temperature difference.

With such a design, for example, supply air in the set ratio between fresh air and exhaust air originating from the last treatment zone can be supplied to a certain other treatment zone, for example in an amount of 15,000 m³/h. The supply air can be set to a temperature between 60° C. and 170° C., for example. This corresponds to a mass of 23,900 to 31,800 kg/h at a pressure of 1,500 Pa.

Finally, a corresponding exhaust air line 41 is preferably provided within the same air supply unit 13, which exhaust air flows through in the opposite direction to supply air flow direction ZS in the opposite exhaust air flow direction AS because the corresponding exhaust air is discharged from a treatment oven by this means.

Furthermore, an exhaust air line 41 is provided from which the exhaust air within a treatment chamber 9 or a treatment zone 7 is extracted, that is, both with respect to the treatment zone upper space 7a and the treatment zone lower space 7b. In this case, therefore, it is not absolutely necessary for two separate lines to be provided as extraction lines that are connected to the treatment zone upper space 7a on the one hand and to the treatment zone lower space 7b on the other hand.

In the extraction line 41 shown in FIG. 5, an exhaust air fan 42 driven by a motor M is also arranged to continue to move the exhaust air through suction line 41.

There is, in turn, a mass flow measuring device 43 in extraction direction AS upstream of exhaust fan 42. This can be used to measure and ultimately control the mass flow delivered by the exhaust air fan. The exhaust air mass flow is to correspond to the sum of the two supply air mass flows. As a result, the regulation of the speed of the exhaust fan can be achieved. In the aforementioned system operating program, an offset value can be entered in which more or less exhaust air is to be drawn in intentionally.

Mass flow measuring device 43 is, in turn, assigned to line portion 41 having a throttle 44. Control line 45 of mass flow measuring device 43 for changing the speed sensor for exhaust air fan 42 is shown by dashed lines. Mass flow measuring device 43 also comprises nozzle 44 (throttle) and a differential pressure sensor and temperature sensor 46 in this case.

Furthermore, a connecting line 49 is provided in which the relevant damper or damper control 48 is connected, for example in the form of a louver damper, and can be actuated via a controllable motor.

This connection line 49 is coupled directly to feed line 21, which then passes through a filter 50 to heat exchanger 35, in the direction of feed line 21 in flow direction DS, that is to say coming from drain line 41 (and downstream of extraction fan 42). If necessary, cleaning or a certain purification of the supplied supply air can be carried out via this filter 50, that is, sublimation substances and oligomers can be filtered out at least in part.

In this mentioned connection line 49, a louver damper device 48, by means of which the exhaust air amount that is not discharged to the outside but is additionally fed back into the same system can be adjusted, is thus provided in flow direction DS directly downstream of discharge line 41. In other words, therefore, the volumetric flow flowing in via exhaust air line 41 from a treatment zone and measured via the mass or volumetric flow measuring device 43 is discharged in a branched manner. Unless the entire volumetric flow extracted from a treatment zone is to be discharged to the outside, the setting (by means of the volume measuring device provided on suction line 41 on the output side by means of which a throttle 55 limiting the amount of flow can be controlled) can be carried out in a branched manner as described such that only a proportion of the volumetric flow obtained from a treatment zone is discharged to the outside (this proportion being measured by means of the mass or volume measuring device 53) and a further proportion is fed back into the same system, that is to say into the same treatment zone, it being possible to adjust this proportionately fed back volumetric flow via louver damper control 48.

The pressure loss of the gas flowing through the filter can be measured by means of a pressure switch 51 connected in parallel with filter 50. A trip value (e.g. 500 Pa) can be set at an associated pressure switch itself. If this value is reached, a "Change filter" alarm signal is displayed in the system operating program. At this point, the filtered-out substances have clogged the filter to such an extent that a change seems necessary.

FIG. 5 thus shows that air supply unit 13 comprises exhaust air mass flow measuring device 53 on the output side (preferably having associated temperature sensor 53') with which the final volume mass flow of the discharged exhaust air can be measured. A minimum value can in turn be entered in the system operating program here as well. If this minimum value is 0 kg/h, this means that as much exhaust air can be admixed to the supply air via bypass flap 55, which in this case is actuated from the exhaust air line into mass flow measuring device 53 and connected in exhaust air line 41, as is required to achieve the desired supply air temperature without having to heat. If, for example, 4,000 kg/h is set, the bypass flap is adjusted in such a way that the desired amount is discharged. If the amount of heat of the remaining amount of bypass air is not sufficient to achieve the desired supply air temperature, the missing heating power is introduced via heat exchanger 35, which is supplied via a heating line 35a, for example by means of heated oil that flows back through a return line 35b.

It is additionally noted that the temperature of the volumetric flow of the air supplied to the respective treatment chamber is ultimately defined or determined primarily by the fresh air supplied via the first branch line 21a and by the exhaust air supplied from the last treatment zone 7.5 via the second branch line 21b, as well as by the exhaust air originating from the same treatment chamber via connecting lines 49 according to the respectively supplied proportion. If the temperature for the corresponding mixing ratio of fresh air, exhaust air originating from the last treatment chamber and exhaust air originating from the same treatment chamber does not have the optimum value, then the corresponding volumetric flow can be correspondingly raised or lowered, that is to say adjusted, for example, via heating control (i.e., heat exchanger) 35.

In this case, louver damper 48 located in connecting line 49 controls the amount of air that is to be introduced back into the same treatment chamber from which this exhaust air originates. The "upper hand" of the control is with bypass flap control 55, which determines what proportion of the volumetric flow (exhaust air) originating from a treatment chamber is ultimately discharged to the outside and what remaining proportion is to be returned into the same treatment chamber as connecting line 49.

For the entire interaction of air supply unit 13, the various control elements for the volumetric flows work together via corresponding control lines or a control bus 32c or act together, only these control lines 32a, 32b, 32c being shown in FIG. 5 by dashed lines, without associated electronic control devices (that were not additionally shown to obtain a better overview in FIG. 5). However, it is noted that, in accordance with the representation according to FIG. 5, all the actuators connected by this means via control lines 32a, 32b and 32c can be controlled not only jointly and in parallel, but also can correspondingly be controlled individually. Control takes place via the control electronics, which are not shown in FIG. 5, that is, primarily by means of dedicated operator software provided for this purpose. The control elements connected to one another in FIG. 5 via control line or control bus 32a, 32b, 32c can "talk" to one another (for example, with the interposition of the electronic control device or also by means of integrated intelligence). This makes it possible to ensure that—if the temperature in the oven is too low (which could be detected, for example, by temperature sensors 31a and 31b)—heater 35 is turned on or damper or louver damper 48 is correspondingly closed more or opened more accordingly by means of the aforementioned control line or the aforementioned control bus 32a, 32b, 32c to thereby control the air temperature and thus avoid unnecessarily turning on the heater so as to save power or oil or energy overall. However, a certain minimum exhaust air quantity that, in any case, has to escape from the system can be preset or prescribed by means of the control elements in the form of the mass flow measuring device 53 and the bypass flap 55 provided in this context. The remaining volume fraction or residual volume can then be recycled back to the same treatment zone 7.

With such a design it is possible, for example, to extract 23,900 to 31,800 kg/h of exhaust air, which varies, for example, within a temperature range of 80° C. to 180° C., and is preferably 10° C. to 20° C. warmer than the supply air, from a treatment zone 7, that is, treatment oven 15. For example, a maximum of 32,000 m³/h can be extracted from the oven at a pressure of 1,500 Pa.

The described design results in a number of advantages over conventional solutions.

Thus, on the one hand, the design of treatment oven 15 has been changed compared to conventional solutions. The treatment oven described in the context of the invention having the associated treatment zones (and the treatment chambers provided therein) is characterized in that no fans and/or heaters and/or filters are provided in the treatment oven interior. These components are now exclusively located in air supply units 13, which are assigned to individual treatment zones 7. The actual treatment zone is now provided only with air nozzles, suck-back nozzles and/or connected collecting ducts.

This achieves a significant improvement in the cleaning of an oven.

This is because the fact that the plurality of components usually provided in the prior art is now omitted in the oven and has been moved into air supply units 13 means that oligomers also cannot precipitate or condense on these no longer existing components. Condensate can thus precipitate on these components, which are no longer present in the treatment space.

Due to the repositioning of the mentioned filter from the oven into the oven air supply units and the associated improved accessibility as well as the merging onto a filter site, the maintenance effort for replacing the filters is significantly reduced compared to conventional solutions.

Another advantage in this context is that it was previously necessary to use filters in special sizes in the individual treatment ovens in conventional systems. Because the filters are now housed in the air supply units, standard sizes can be used for the filters, which can reduce the filter costs by up to half.

The present invention significantly reduces the required heating energy for the operation of a stretching oven. It is even possible, in particular, to operate the mentioned cooling zones purely using the heat introduced by the film.

In the context of the invention it is proposed to feed the exhaust air, preferably only from the last treatment zone 7 (in which the exhaust air is cleanest), into the supply air of at least two treatment zones or ovens upstream in the process via a bypass. The energy content of this partial quantity is practically used completely again.

Insofar as it has been suggested, exhaust air is not discharged from the individual treatment zones 100% completely but can also be returned in part to the system in a controlled manner at a preselected volume fraction. In particular, energy can also be saved in turn when supplying exhaust air from treatment zones having low soiling.

Finally, however, the amount of dirt in each treatment zone is reduced and the situation is improved to be able to clean the oven accordingly. On the one hand, provision can be made in the context of the air supply units for, in particular, the exhaust air ducts to also be equipped with such a large diameter that this increase in the air flow rate in the individual treatment zones makes 100% air exchange operation possible in virtually all cooling zones.

By installing an adjustable bypass valve, a preselectable proportion of exhaust air of a certain treatment zone can preferably be additionally fed into the fresh air supplied to this treatment zone.

An improvement also results from the fact that each air supply unit (13) preferably has two supply air fans, namely a supply air fan that is assigned to the treatment zone upper space and a supply air fan that is assigned to the treatment zone lower space.

Finally, because the supply air is only introduced into the treatment zones (and chambers) via nozzles, a so-called "condensate trap" is avoided (which occurs when mixing cold fresh air with warm, oligomer-laden circulating air) because this mixing no longer takes place in the treatment zones but in the respective air supply unit. As a result of the arrangement of the condensate trap directly in front of the filter, the oligomers are immediately collected by the filter and do not deposit on other components.

In this case, the use of throttle valves or so-called louver dampers proves to be particularly favorable because the intake ratio between fresh air from the environment and exhaust air from a treatment oven having low soiling can be optimally adjusted, specifically manually or automatically and independently by means of appropriate process-controlling devices.

The described invention can be used for a wide variety of stretching systems for producing a wide variety of films, such as thin films, thick films, etc. It is also suitable for the production and stretching of plastic films comprising different materials, for example for the production of PET films or BOPET films (i.e. for biaxially oriented PET films).

Due to the design of the stretching system according to the invention, various advantages can be realized. These advantages include, firstly, the described optimal air reuse or air distribution, resulting in the following improvements:

1. Reduction of heating energy requirement
2. Improvement in the contamination in the oven One or more of the following aspects are important here:
a) the air in zones 7 is completely extracted from the zones (CZ-1, CZ-2, CZ-3), and/or
b) a portion of this air is combined with fresh air and/or CZ-3 air upstream of filter 50, and/or
c) this combined and clean air (clean due to the fact that the impurities/oligomers are kept back in the filter) is blown back into the zones. The required temperature for each zone can be controlled by the mixing ratio, which can accordingly save heating power.

Finally, with reference to FIG. 6, it is pointed out that an air supply unit 13 can, in principle, be provided for the last treatment zone 7.5, that is, the last of three cooling zones CZ-3 provided in the embodiment shown, as is also provided for the other treatment zones 7.1 to 7.4. However, because the last treatment zone 7.5 cannot receive any exhaust air from a treatment zone further downstream of the film in the drawing-off direction, air supply unit 13 for the last treatment zone 13 can be made simpler than air supply units 13 for the upstream treatment zones 7.1 to 7.4 in a slimmed-down version.

FIG. 6 shows the components that are preferably provided for the last treatment zone 7.5 in air supply unit 13. The components shown there and provided with corresponding reference signs are the components that are also provided in the explanation according to FIG. 5. However, some components are omitted in this embodiment, namely:

1) In the variant according to FIG. 6, only one supply line 21 for supplying fresh air is provided for the last treatment zone; the branch line 21b shown in FIG. 5 for supplying exhaust air from a subsequent treatment chamber is omitted because there is no longer any subsequent treatment zone with respect to the last treatment zone 7. For the same reasons, the driveable valve controls 23a, 23b shown in FIG. 5 for air supply unit 13 for the last treatment chamber 7 are not necessary either and are omitted in the variant according to FIG. 6.

2) Nevertheless, this embodiment also provides for the last treatment zone 7.5 that exhaust air from this last treatment zone 7.5 is not 100% discharged to a plurality of upstream treatment zones and/or does not need to be discharged from the system as exhaust air AL-R, but that at least a portion of this volumetric flow can also be returned to the same last treatment zone 7.5. Therefore, connecting line 49 is provided with louver damper 48, which can be controlled via a motor M, by means of which the proportion of the returned volume of exhaust air originating from the last treatment chamber that can be supplied to the same last treatment chamber 7.5 in addition to the fresh air supplied via supply line 21 can also be adjusted.

3) Control by means of an exhaust air mass flow measuring device 53 having an associated temperature sensor 53' and the bypass flap 55 shown in FIG. 5 has been omitted. Preferably, no controller is provided for a minimum discharge of exhaust air here. The remaining exhaust air flow or the rest of the exhaust air flow (if part of the exhaust air volume is returned to the same last treatment chamber via connecting line 49) then determines the volume fraction that can be supplied to the plurality of other upstream treatment zones, unless—as shown—another residual portion AL-R is to be extracted from the entire system. However, it is noted that, in suction line 41, an additional exhaust air mass flow measuring device 53 that also regulates the volumetric flow can be provided with associated bypass flaps 55 and preferably an associated temperature sensor 53'.

Finally, it is emphasized that instead of the explained components, such as, for example, the louver dampers, throttles etc., it is possible to use controlling or regulating elements that have the same effect.

The invention claimed is:

1. A film stretching system comprising:
   (a) a stretching oven through which a plastic foil film moves in a drawing-off direction from a feed side to an outlet side through the stretching oven,
     wherein the stretching oven comprises a plurality of successive treatment zones comprising a first treatment zone, a second treatment zone, and a last treatment zone, the first treatment zone, the second treatment zone, and the last treatment zone being successive treatment zones in the drawing-off direction,
     wherein the plastic foil film divides each treatment zone of the first, second, and last treatment zones into a treatment zone upper space located above the plastic foil film and a treatment zone lower space located below the plastic foil film,
     wherein the first treatment zone comprises a first air supply configured to supply a first air to the first treatment zone and comprises a first air exhaust configured to discharge a first exhaust from the first treatment zone,
     wherein the second treatment zone comprises a second air supply configured to supply a second air to the second treatment zone and comprises a second air exhaust configured to discharge a second exhaust from the second treatment zone, and
     wherein the last treatment zone comprises a last air supply configured to supply a last air to the last treatment zone and comprises a last air exhaust configured to discharge a last exhaust from the last treatment zone; and
   (b) a ventilation system for the plurality of successive treatment zones,
     wherein the ventilation system is configured to extract the last exhaust discharged from the last treatment zone in the last air exhaust and is configured to supply the last exhaust to the first treatment zone via the first air supply and to supply the last exhaust to the second treatment zone via the second air supply, and
     wherein a first volume fraction of the last exhaust extracted from the last treatment zone is supplied to the first treatment zone, and
     wherein a second volume fraction of the last exhaust extracted from the last treatment zone is supplied to the second treatment zone.

2. The stretching system according to claim 1, wherein the plurality of successive treatment zones comprises a third treatment zone between the first treatment zone and the last treatment zone,
   wherein the third treatment zone comprises a third air supply configured to supply a third air to the third treatment zone and comprises a third air exhaust configured to discharge a third exhaust from the third treatment zone,
   wherein the ventilation system is configured to supply the last exhaust to the third treatment zone via the third air supply,
   wherein the ventilation system is configured to supply each of the first treatment zone, the second treatment zone, and the third treatment zone, with last exhaust only from the last treatment zone.

3. The stretching system according to claim 1, wherein an outside atmosphere is outside the stretching system and,
   wherein the ventilation system either is configured to recycle the first exhaust into the first air for supply to the first treatment zone or is configured to discharge the first exhaust to the outside atmosphere or,
   wherein the ventilation system either is configured to recycle the second exhaust into the second air for supply to the second treatment zone or is configured to discharge the second exhaust to the outside atmosphere.

4. The stretching system according to claim 3, wherein a first mass or volume ratio of the first air supplied to the first treatment zone comprises fresh air and the first exhaust, or
   wherein a second mass or volume ratio of the second air supplied to the second treatment zone comprises fresh air and the second exhaust.

5. The stretching system according to claim 1, wherein the last air supply of the last treatment zone comprises an air supply unit having a cooling zone configured to supply only fresh air to the last treatment zone.

6. The stretching system according to claim 1, wherein at least one of the plurality of successive treatment zones comprises an air supply unit having at least two supply air fans, wherein the at least two supply air fans comprises an upper supply air fan arranged in an upper supply air branch line and a lower supply air fan arranged in a lower supply air branch line, wherein the air supply unit is configured to supply air above the plastic foil film via the upper supply air branch and is configured to supply air below the plastic foil film via the lower supply air branch.

7. The stretching system according to claim 1, wherein at least one of the plurality of successive treatment zones comprises an air supply unit configured to adjust a volumetric flow of a mixture of fresh air and exhaust from the at least one of the plurality of successive treatment zones.

8. The stretching system according to claim 7, wherein at least one of the plurality of successive treatment zones comprises
   an air supply unit comprising
     a connecting line that connects the respective air exhaust to the respective air supply, and
     a controllable bypass passage having a controllable damper.

9. The stretching system according to claim 1, wherein at least one of the plurality of successive treatment zones does not comprise a cooling zone, and wherein the at least one of the plurality of successive treatment zones comprises
   an air supply unit comprising,
     a fresh air supply branch line, and
     a damper that is configured to control a ratio of a fresh air volumetric flow in the fresh air supply branch line to an exhaust air flow.

10. The stretching system according to claim 1, wherein the at least one of the first or second supply air fans comprises a control valve configured such that the last exhaust is recycled to the first treatment zone or the second treatment zone.

11. The stretching system according to claim 1, wherein at least one of the plurality of successive treatment zones comprises a cooling zone which receives fresh air.

12. The stretching system according to claim 1, wherein at least one of the plurality of successive treatment zones comprises an air supply unit having an air filter device.

13. The stretching system according to claim 1, wherein at least one of the plurality of successive treatment zones is free of at least one of a fan, a heater, and a filter.

14. The stretching system according to claim 1, wherein at least one of the plurality of successive treatment zones is configured to supply air only via supply nozzles or is configured to supply exhaust only via outlet openings or outlet nozzles.

* * * * *